F. NIMCHEK.
GRASS CUTTER.
APPLICATION FILED JAN. 29, 1918.
1,277,105.
Patented Aug. 27, 1918.
3 SHEETS—SHEET 3.
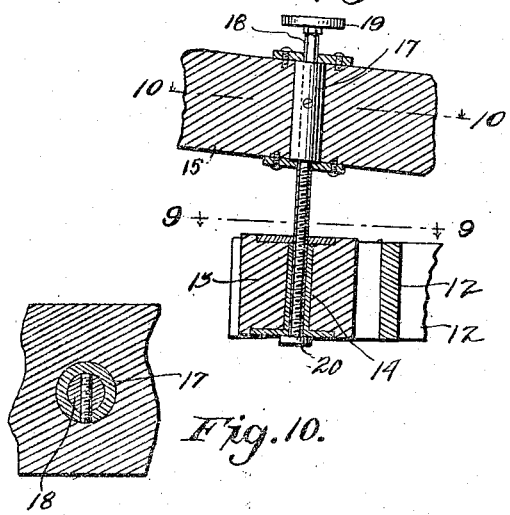
Fig. 8.
Fig. 10.
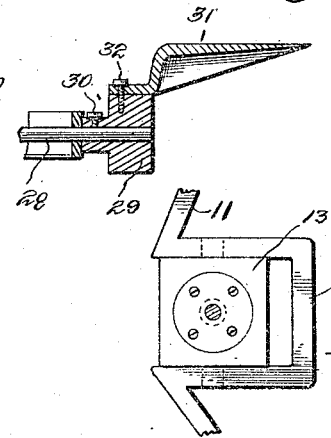
Fig. 7.
Fig. 9.
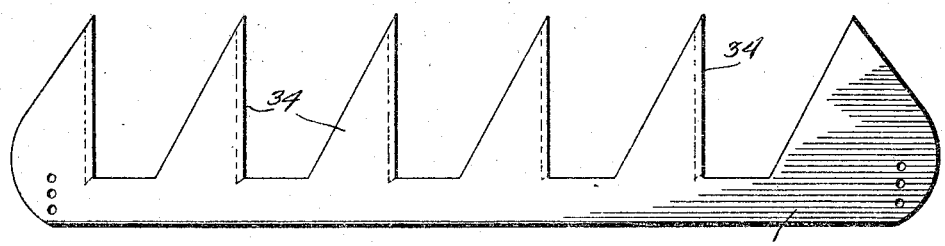
Fig. 4.
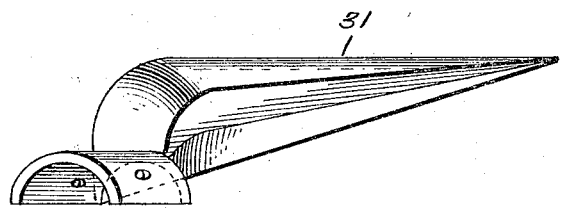
Fig. 5.
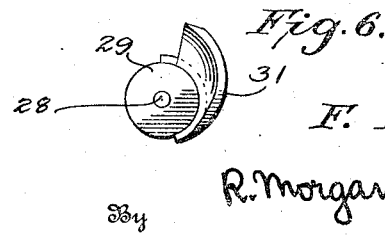
Fig. 6.
Witnesses
Inventor
F. Nimchek
By R. Morgan Elliott & Co.
Attorneys

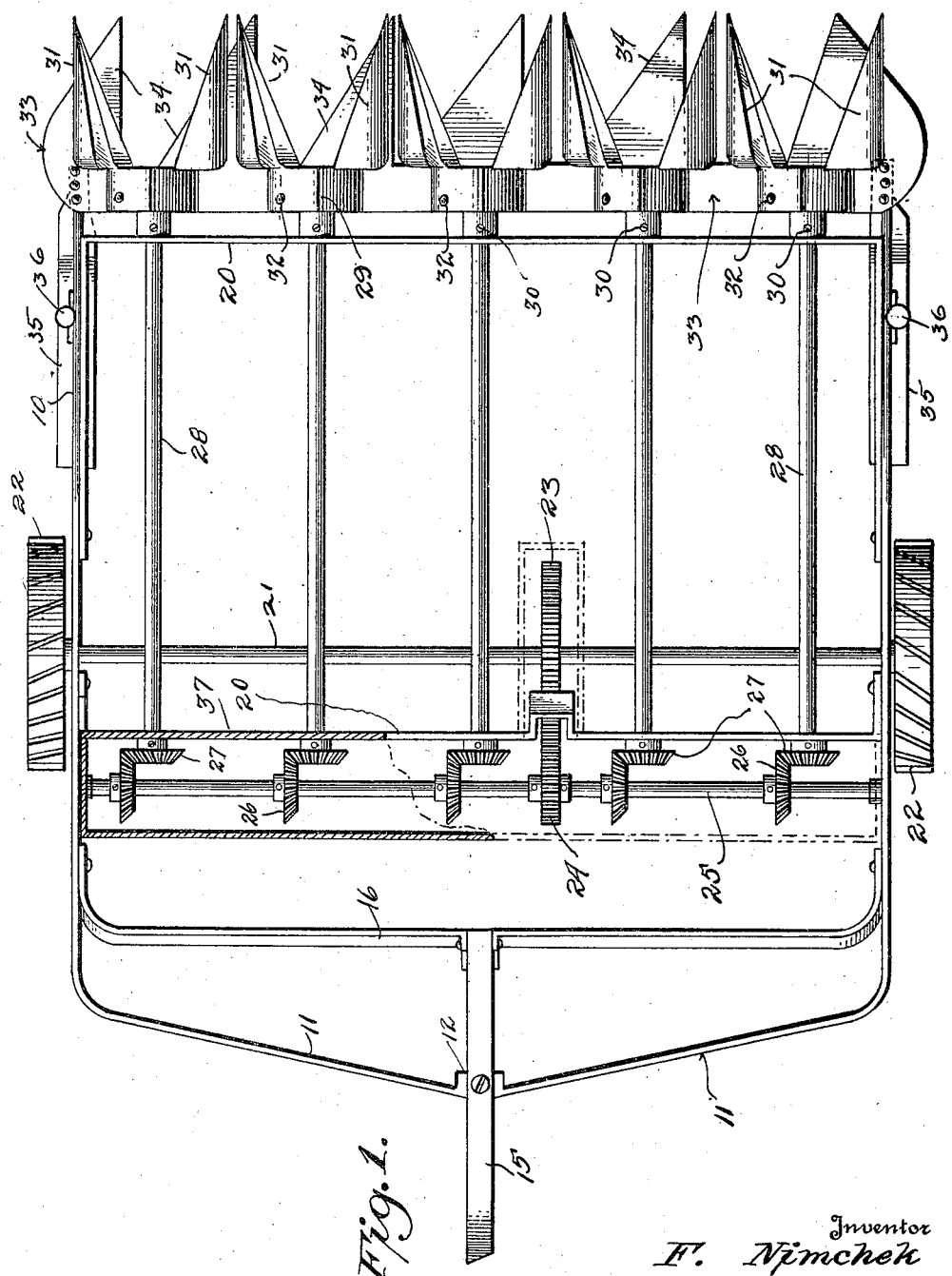

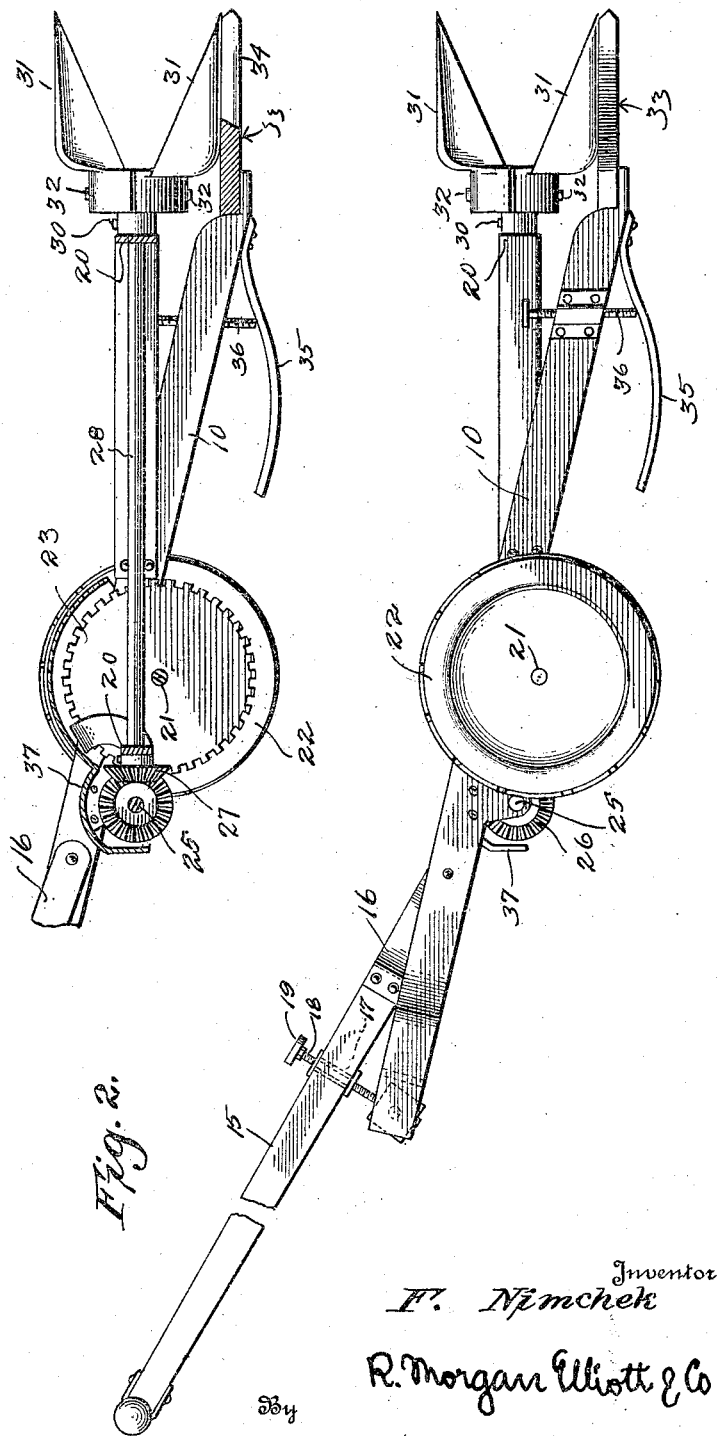

UNITED STATES PATENT OFFICE.

FRANK NIMCHEK, OF BENBUSH, WEST VIRGINIA.

GRASS-CUTTER.

1,277,105.

Specification of Letters Patent.   Patented Aug. 27, 1918.

Application filed January 29, 1918.   Serial No. 214,363.

*To all whom it may concern:*

Be it known that I, FRANK NIMCHEK, a citizen of the United States, residing at Benbush, in the county of Tucker and State of West Virginia, have invented certain new and useful Improvements in Grass-Cutters, of which the following is a specification.

This invention relates to harvesting devices and has special reference to a grass cutter or lawn mower.

One object of the invention is to improve and simplify the general construction of devices of this character.

A second important object is to provide an improved grass cutter or lawn mower wherein the cutting will be effected by rotary elements.

A third object of the invention is to provide an improved arrangement of lawn mower wherein the effective height from the ground may be regulated.

With the above and other objects in view, as will be hereinafter apparent the invention consists in general of certain novel details of construction and combinations of parts hereinafter fully described, illustrated in the accompanying drawing, and specifically claimed.

In the accompanying drawing, like characters of reference indicate like parts in the several views, and:—

Figure 1 is a plan view of a lawn mower constructed in accordance with this invention, a portion of the gear casing being broken away to show the arrangement of the gears within the casing, the broken away portion being indicated in dotted lines.

Fig. 2 is a side elevation of the mower.

Fig. 3 is an enlarged detail section taken longitudinally of the machine.

Fig. 4 is a plan view of the stationary knife.

Fig. 5 is a detail perspective of one of the rotary knives.

Fig. 6 is a detail end view of one of the rotary knives.

Fig. 7 is a section showing the attachment of the rotary knife to its hub and the hub to its shaft.

Fig. 8 is a sectional view showing the method of adjusting the angle between the handle and frame.

Fig. 9 is a section on the line 9—9 of Fig. 8.

Fig. 10 is a section on the line 10—10 of Fig. 8.

In carrying out the objects of this invention there is provided a main frame having side members 10 and the diagonally disposed rear members 11. These diagonally disposed rear members are joined by a yoke 12 wherein is pivotally mounted a bearing block 13. This bearing block 13 is provided with a centrally disposed sleeve 14 for purposes to be hereinafter described. At 15 is the usual handle which is connected to the frame side 10 by means of bars 16. In this handle is a threaded sleeve 17 wherethrough passes an adjusting screw 18 having at its top a hand wheel 19. This adjusting screw also passes through the sleeve 14 and at its bottom is a stop collar so that when the handle is grasped and raised, the limit of its raising movement relative to the frame is controlled by the position of the screw 18. Connecting the frame sides 10 are cross bars 20 and journaled on the frame sides 10 is a shaft 21 carrying the ground wheels 22 which serve to support the rear end of the frame and at the same time act as driving wheels for the shaft 21. On the shaft 21 is a driving gear 23 which meshes with a gear 24 fixed on the shaft 25 having its ends journaled in the side members 10. Spaced along the shaft 25 are the beveled gears 26 each of which meshes with a respective beveled gear 27 fixed upon a shaft 28 journaled in the cross bars 20. On the lower ends of the shafts 28 are mounted knife carriers 29, the carriers being detachably held on the shafts by set screws 30. On each of these knife carriers is mounted a pointed knife 31 which is arcuate in cross section throughout its length and is held detachably on the carrier 29 by the screws or bolts 32. It is preferred, for coarse work and high grass to use two of these knives while for short fine grass one of the knives may be detached from each carrier so that only one knife is used. Mounted on the lower ends of the side frame members 10 is a fixed knife blade 33 provided with triangular knives 34 wherein the blades 31 coöperate the arrangement being such that a slicing cut is given as illustrated in Fig. 1. It will be observed that the contour of the blades 31 will be made such as to produce a cut throughout their length.

In order to support the lower or forward end of the frame there is secured to the side frame members a plurality of leaf springs 35 the rear ends of which may be adjusted up and down by means of an adjusting screw 36 so that the fixed knife 33 may be raised or lowered from the ground. Moreover these springs 35 prevent the device from sinking into the soil.

The operation of the device will be readily understood to consist simply in pushing the lawn mower forward through the grass as in an ordinary lawn mower. This will effect rapid rotation of the cutter carriers 29 and the blades carried thereby and effectively cut the grass. In order to protect the gearing from flying grass lodging therein a cover 36 is provided as can be seen by reference to Fig. 1.

There has thus been provided a simple and efficient device of the kind described and for the purpose specified.

It is obvious that many minor changes may be made in the form and construction of the invention without departing from the material principles thereof. It is not therefore desired to confine the invention to the exact form herein shown and described but it is wished to include all such as properly come within the scope claimed.

Having thus described the invention, what is claimed as new, is:—

1. In a device of the kind described, a frame, a fixed cutter bar extending transversely of said frame, ground wheels supporting said frame, a shaft operatively connected to the ground wheels, a series of shafts extending longitudinally of the frames, gears connecting the first shaft with the series of shafts, and rotary knives carried by the forward ends of the series of shafts and coöperating with the cutter bar.

2. In a device of the kind described, a frame, a fixed cutter bar extending transversely of said frame, ground wheels supporting said frame, a shaft operatively connected to the ground wheels, a series of shafts extending longitudinally of the frames, gears connecting the first shaft with the series of shafts, hubs on the forward ends of said series of shafts, means to detachably connect the hubs to their shafts, a plurality of knife blades extending forward from each hub, and means to detachably attach the blades to the respective hubs.

In testimony whereof I affix my signature.

FRANK NIMCHEK.

Copies of this patent may be obtained for five cents each, by addressing the "Commissioner of Patents, Washington, D. C."